(12) United States Patent
Gotta et al.

(10) Patent No.: US 7,354,254 B2
(45) Date of Patent: Apr. 8, 2008

(54) COMPACT VACUUM PUMP

(75) Inventors: Romina Silvia Gotta, Bosconero (IT); Cinzia Del Missier, Turin (IT); Cristian Maccarrone, Turin (IT); Fausto Casaro, Turin (IT)

(73) Assignee: Varian, S.p.A., Leini, Turin (IT)

( * ) Notice: Subject to any disclaimer, the term of this patent is extended or adjusted under 35 U.S.C. 154(b) by 587 days.

(21) Appl. No.: 10/857,192

(22) Filed: May 28, 2004

(65) Prior Publication Data

US 2004/0265152 A1  Dec. 30, 2004

(30) Foreign Application Priority Data

Jun. 5, 2003  (IT)  ........................... TO2003A0421

(51) Int. Cl.
*F04B 17/00* (2006.01)
*F04B 35/04* (2006.01)
*F04B 23/14* (2006.01)

(52) U.S. Cl. ................. 417/423.4; 417/423.7; 417/201

(58) Field of Classification Search ............. 417/423.4, 417/423.7, 355, 205, 201; 310/266, 254, 310/216, 268; 62/55.5
See application file for complete search history.

(56) References Cited

U.S. PATENT DOCUMENTS

| 1,810,083 | A | 6/1931 | Norinder |
| 2,313,682 | A * | 3/1943 | Stuart, Jr. ..................... 33/361 |
| 2,653,257 | A | 9/1953 | Sailer |
| 4,140,441 | A * | 2/1979 | Patterson ................. 417/423.4 |
| 4,491,753 | A | 1/1985 | Kumatani |
| 4,854,034 | A * | 8/1989 | Archibald et al. ............ 29/596 |
| 5,542,825 | A | 8/1996 | Perrillat-Amede et al. |
| 5,861,699 | A * | 1/1999 | Kopac ......................... 310/254 |
| 6,158,986 | A | 12/2000 | Casaro et al. |
| 6,179,953 | B1 | 1/2001 | Deevi et al. |
| 6,457,954 | B1 * | 10/2002 | Adamietz et al. ......... 417/423.4 |
| 2002/0108569 | A1 * | 8/2002 | Yamauchi ................... 118/666 |

FOREIGN PATENT DOCUMENTS

| DE | 35 26 948 A1 | 1/1986 |
| GB | 1 493 845 A | 11/1977 |
| JP | 03237296 A * | 10/1991 |

* cited by examiner

Primary Examiner—Devon C. Kramer
Assistant Examiner—Jessica L Frantz
(74) Attorney, Agent, or Firm—Bella Fishman

(57) ABSTRACT

A compact turbomolecular vacuum pump (1) is driven by a cup-type motor (8). The cup-shaped rotor of the motor is preferably integrated into the pump rotor (14) and may define corresponding pumping stages, for instance Holweck stages, wherein the stators (11, 12) of said stages being preferably obtained by superimposing stator rings (11', 12').

14 Claims, 5 Drawing Sheets

COMPACT VACUUM PUMP

FIELD OF THE DISCLOSURE

The present invention relates to a vacuum pump, more particularly to a compact turbomolecular vacuum pump.

BACKGROUND OF THE DISCLOSURE

Conventional turbomolecular vacuum pumps generally comprise an external housing, which houses the gas pumping stages, obtained through the co-operation of stator rings integral with the pump body and rotor disks integral with a rotating shaft rotated by the pump motor.

In many applications, pumps with the smallest possible size, in particular in axial direction, are required. Analytical instruments, such as mass spectrometers or gas chromatographs give an example of such applications.

Several compact turbomolecular vacuum pumps have already been proposed in the past.

U.S. Pat. No. 5,542,825 discloses a turbomolecular vacuum pump with a bell-shaped rotor, i.e. a rotor having an axial cavity extending over part of the rotor length. The corresponding stator has a portion external to the cavity and provided with stator disks co-operating with rotor disks for forming the pumping stages, and an internal portion penetrating into the cavity and supporting the stator portion of the motor. The motor rotor is a permanent magnet placed in a central bore of a shaft forming an integral with the pump motor.

U.S. Pat. No. 6,158,986 discloses a pump with a bell-shaped rotor, the cavity of which houses the pump motor, which is an "inverted" motor, that is a motor with internal stator and external rotor. The motor stator being an integral with the pump body and the motor rotor is coupled with the internal surface of the cavity.

U.S. Pat. No. 6,179,953 discloses another example of inverted-motor pump, in which the motor rotor axially extends over substantially the whole internal cavity of the pump housing and forms also the pump rotor.

Both the solution using a motor with conventional arrangement, and the solutions using an inverted motor have some drawbacks: the pump rotor is heavy and gives rise to balancing problems; moreover, rotating magnetic parts exist. For the vacuum pump disclosed in the U.S. Pat. No. 5,542,825 a modified motor is especially needed, with a rotor inside the shaft, however the structure would be complex.

Thus, it is an advantage of the present invention, which provides a compact vacuum pump, with high structural simplicity.

It is another object of the invention to provide a compact turbomolecular vacuum pump, which is easy and inexpensive to manufacture.

SUMMARY OF THE DISCLOSURE

The present invention provides a compact vacuum pump in which its rotor is coupled with and preferably integrated into the rotor of an electric motor of the, so-called, cup type. The electric motor comprises an internal stator member and an external stator member separated by a hollow space in which the motor rotor is placed, the latter being made of a bell-shaped hollow cylinder made of a lightweight, non-magnetic and electrically conducting material.

Cup-type motors are known (for example, U.S. Pat. No. 2,653,257), however they are customary employed to drive small instruments, such as magnetic tachometers, gyroscopes etc., having low rotation speeds. According to the present invention, these types of motors become applicable to vacuum pump, in particular to turbomolecular pumps, having very high rotation speeds (even up to 100,000 rpm).

Advantageously, according to the invention, the motor rotor is positioned in a bell-shaped appendage of the pump rotor, placed in the hollow space between the stator members of the motor. In such case, the rotor disks of the pumping stages are provided only on the pump rotor portion axially located outside the hollow space.

According to another aspect of the invention, at least one, and preferably both, of the stator members of the motor are so constructed as to form pumping stages, e.g. Holweck stages, with the rotor of the cup-type motor.

BRIEF DESCRIPTION OF THE DRAWINGS

Further features of the invention will become more apparent from the following description of a preferred embodiment, given by way of non-limiting example and shown in the accompanying drawings, in which.

DETAILED DESCRIPTION OF THE DISCLOSURE

Figure 1:
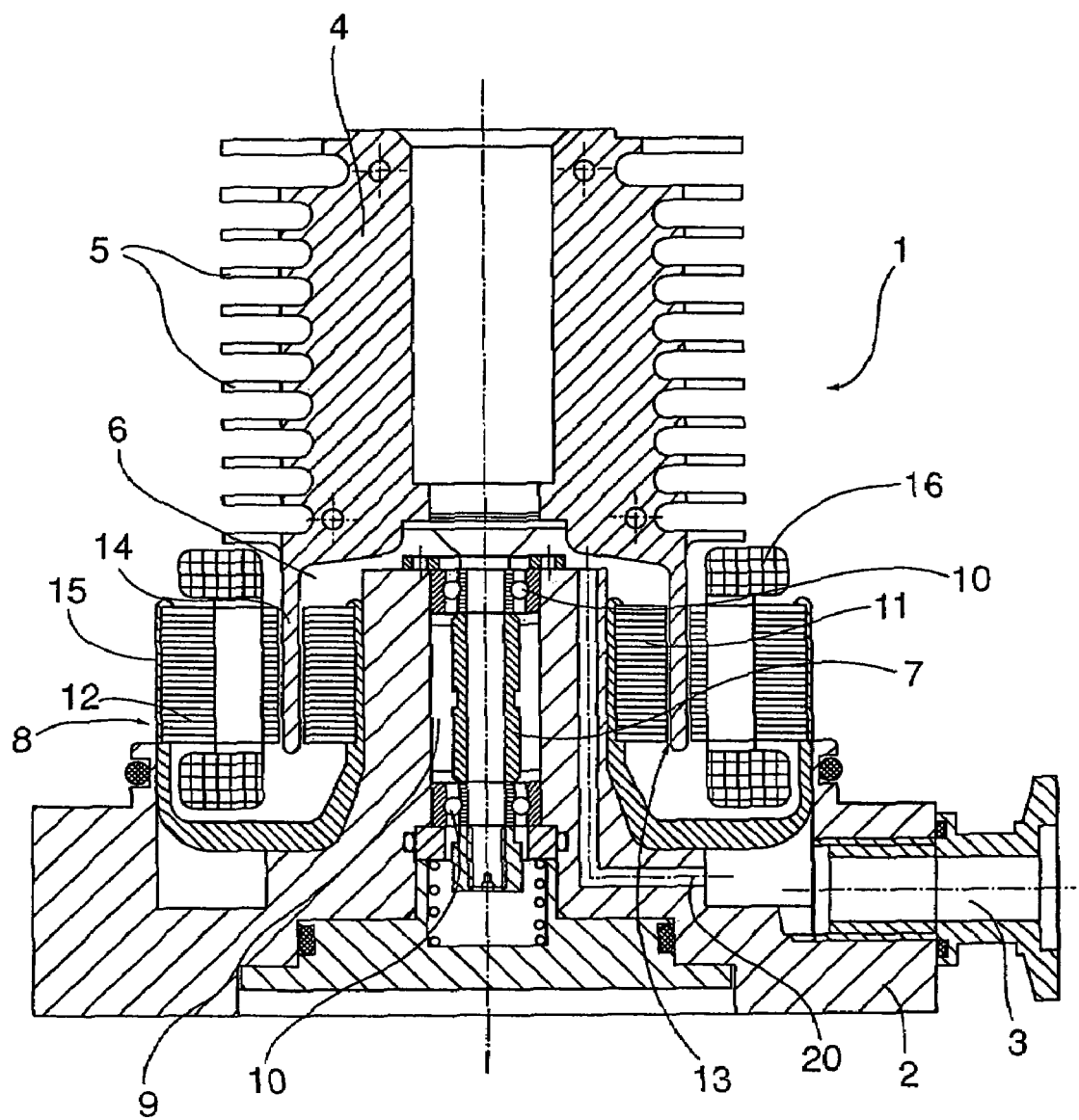
FIG. 1 is an axial cross-sectional view of a vacuum pump according to a first embodiment of the invention.

Referring to FIG. 1, the vacuum pump according to the present invention comprises a body 1, made of metal, having base 2 where an outlet port 3 and seats for other pump components are formed. These components will not be described in detail since they are known prior art.

The vacuum pump further has a rotor 4 with rotor disks 5, intended to co-operate with stator rings integral with the pump body to form a plurality of pumping stages. The stator rings and the external part of body 1 with which they are integral are not shown in the drawing. Rotor 4 is preferably made of a lightweight metal, for example an aluminium alloy.

Rotor disks 5 may be planar disks or disks with inclined and closely hollow spaced vanes, conventional for such pumps.

Rotor 4 has, on its side directed towards base 2 of pump body 1, a bell-shaped axial cavity 6, at the centre of which rotating shaft 7 supporting rotor 4 is located. Axial cavity 6 is defined within a cup-shaped portion 14 of rotor 4, which portion acts as the rotor of the motor, generally shown at 8, which drives pump 1. Shaft 7 is located in a seat formed inside a hollow cylindrical portion 9 of base 2, extending upwards from base 2 towards rotor 4, and is supported by rotating support members, such as rolling bearings 10.

According to the invention, motor 8 is a cup-type motor, comprising an internal stator 11 and an external stator 12 separated by a hollow space 13 where portion 14 of rotor 4 is disposed.

In the embodiment shown in FIG. 1, pump rotor portion 14, acting as the rotor of motor 8, is integrally made with vacuum pump rotor 4 and consists in a substantially bell-shaped hollow appendage defining cavity 6 housing internal stator 11 of motor 8.

In the alternative, pump rotor 4 and rotor portion 14, acting as the motor rotor 8 could be two separate members, fastened to each other in any suitable manner. Also in this second case motor rotor 14 is preferably made of a light-weight non-magnetic material, e.g. an aluminium alloy, like vacuum pump rotor 4.

Stators 11, 12 of motor 8 are mounted in a housing 15, and one of them is equipped with windings 16 for supplying stators 11, 12 with power. In the drawing, such windings are provided on external stator 12. In the alternative embodiment, they may be provided on internal stator 11.

In the embodiment shown in FIG. 1, the rotor rings are provided only in the upper rotor portion, outside motor 8.

To take advantage of the whole surface of the pump rotor and to improve performance, motor 8 is constructed so as to form a pair of cascaded Holweck pumping stages, one between external stator 12 of motor 8 and motor rotor 14, and the other between motor rotor 14 and internal motor stator 11.

According to this embodiment, gas is pumped downwards through the hollow space between external stator 12 and rotor 14 and then upwards through the hollow space between rotor 14 and internal stator 11, and it is evacuated through channel 20 and port 3.

Figure 2:
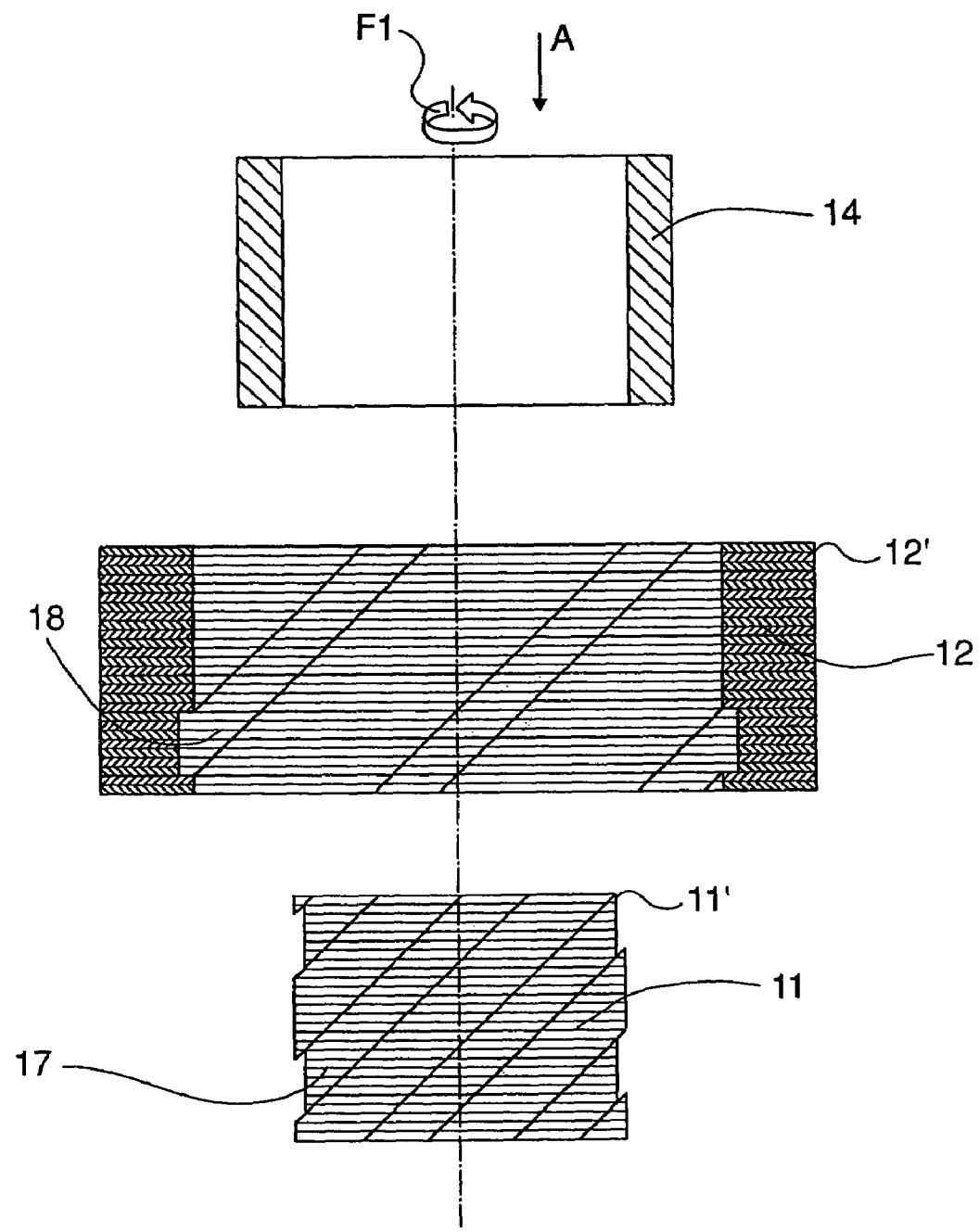
FIG. 2 is an exploded axial cross-sectional view of the motor of the pump shown in FIG. 1, constructed so as to form Holweck stages.

Referring to FIG. 2, the drawing shows, from top to down: rotor 14 of pump motor 8, in cross-sectional view; external stator 12 of motor 8, also in cross-sectional view; and the external surface of internal stator 11 of motor 8.

Advantageously, the external surface of stator 11 and the internal surface of stator 12 (i.e., the surfaces facing rotor 14) each have a set of substantially helical grooves 17 and 18, respectively, for gas pumping. It is to be appreciated that the winding direction of the helical grooves 17, 18 depends on the rotation direction of the motor rotor, indicated by arrow F1 in FIG. 2.

Depending on the performance desired for the vacuum pump, a single Holweck pumping stage, defined by the internal or the external motor stator, might be provided. Still depending on the performance desired, one or more additional cascaded pumping stages might be provided.

It is to be appreciated that grooves 17 and 18 might be alternatively formed on the external and/or internal surface of rotor 14.

Clearly, grooves 17, 18 might be formed according to different variant embodiments, for instance according to a variable pitch helix, with non-rectangular (e.g. trapezoidal) groove section, with variable groove size, etc.

For sake of simplicity, stator windings 16 are not shown in FIG. 2. Moreover, it has been assumed that motor rotor 14 is a unit distinct from vacuum pump rotor 4.

Advantageously, motor stators 11, 12 are formed by a plurality of stacked up rings. That structure allows for forming very easily grooves 17 and/or 18 when motor 8 comprises the Holweck pumping stage(s).

Figure 3:
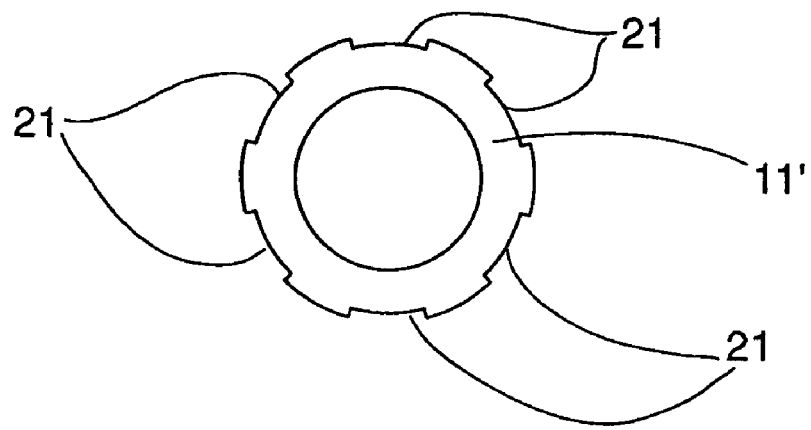
FIGS. 3 and 4 are plan views of a pair of rings forming the internal and the external stator, respectively, of the motor shown in FIG. 2.
Figure 4:
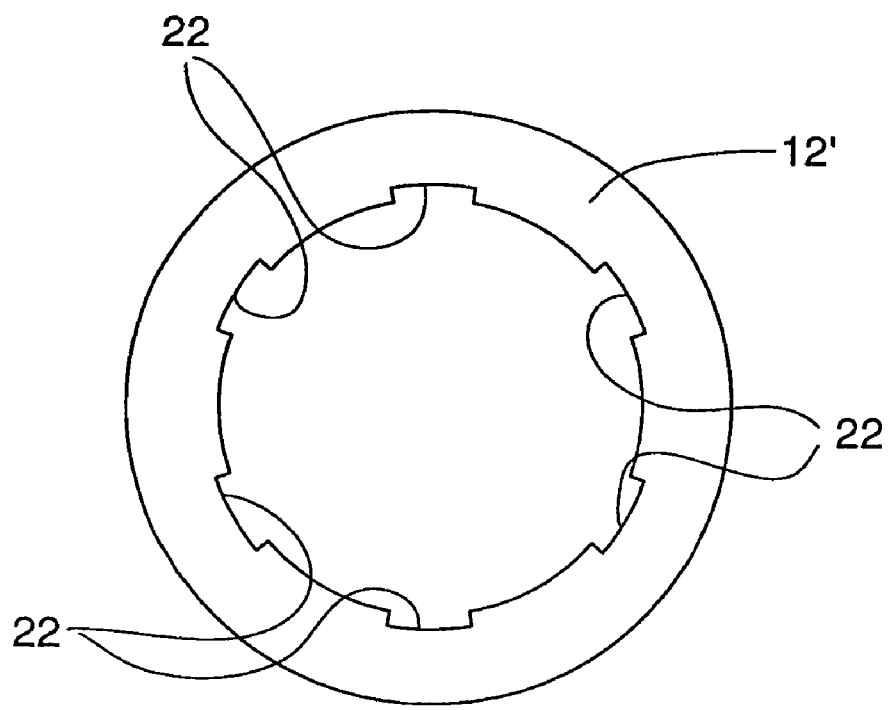

More particularly, as shown in FIGS. 3 and 4, that each ring 11' of stator 11 and/or each ring 12' of stator 12 can have a plurality of notches 21 and 22, respectively, on its internal and external surface, respectively. Advantageously, said rings 11', 12' could be obtained by pressing. During assembling, successive rings are superimposed and stacked up with an angular offset, so that the respective notches give rise to the helical grooves 17, 18.

It is to be appreciated that such a solution allows for dispensing with forming the channels by milling. For that reason, the solution is advantageous independently of the fact that the pumping stage also acts as the stator of the electrical pump motor.

Clearly, the shape and the arrangement of notches 21, 22 define the characteristics of the grooves 17, 18. In the embodiment shown, said notches 21, 22 are equally spaced and have a rectangular profile and grooves 17, 18 will have the same characteristics. However, it is possible to have notches 21, 22 with a different arrangement along the circumference of rings 11', 12', and/or with a non-rectangular (e.g. trapezoidal) profile, thereby obtaining corresponding grooves 17, 18.

Figure 5:
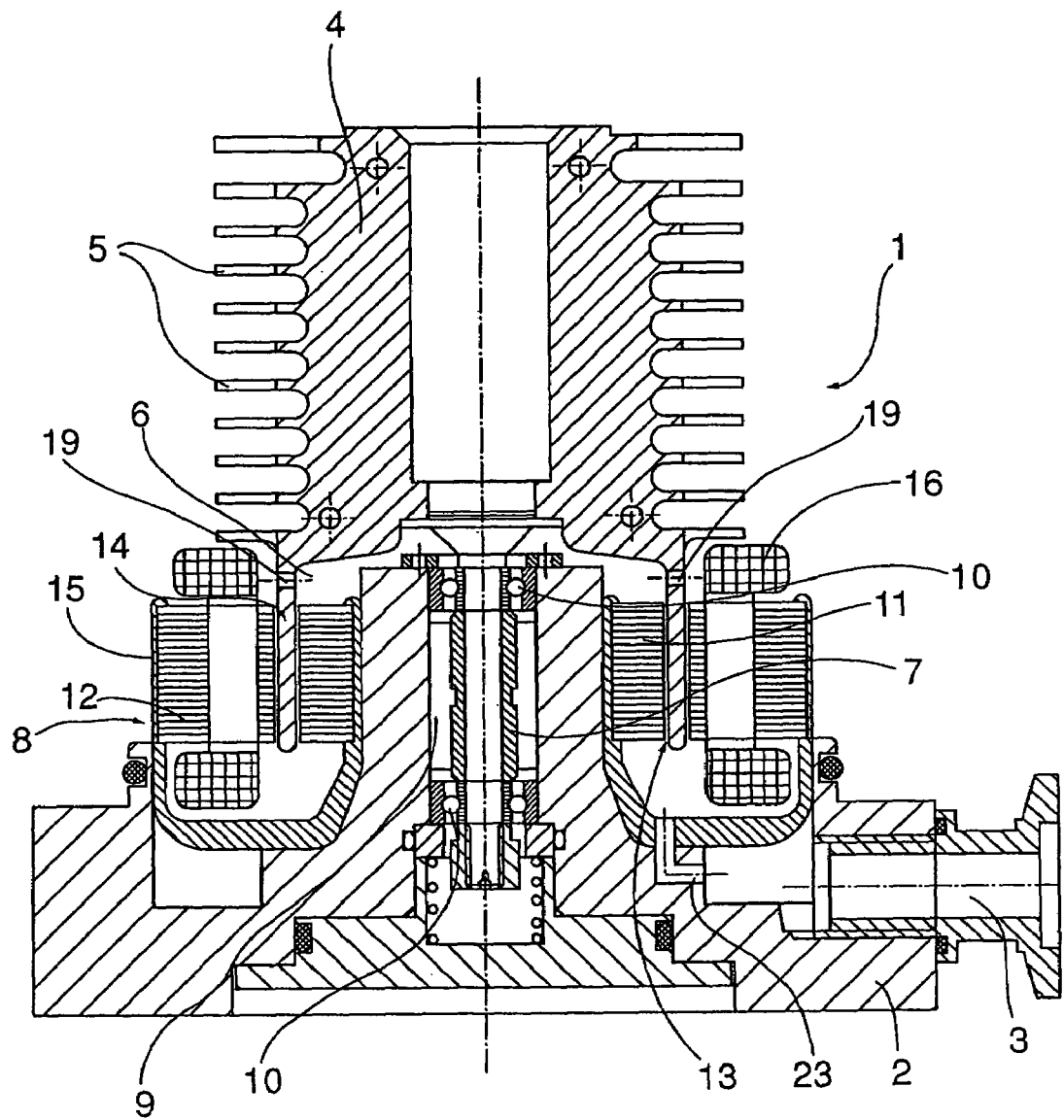
FIG. 5 is an axial cross-sectional view of a vacuum pump according to a second embodiment of the invention.
Figure 6:
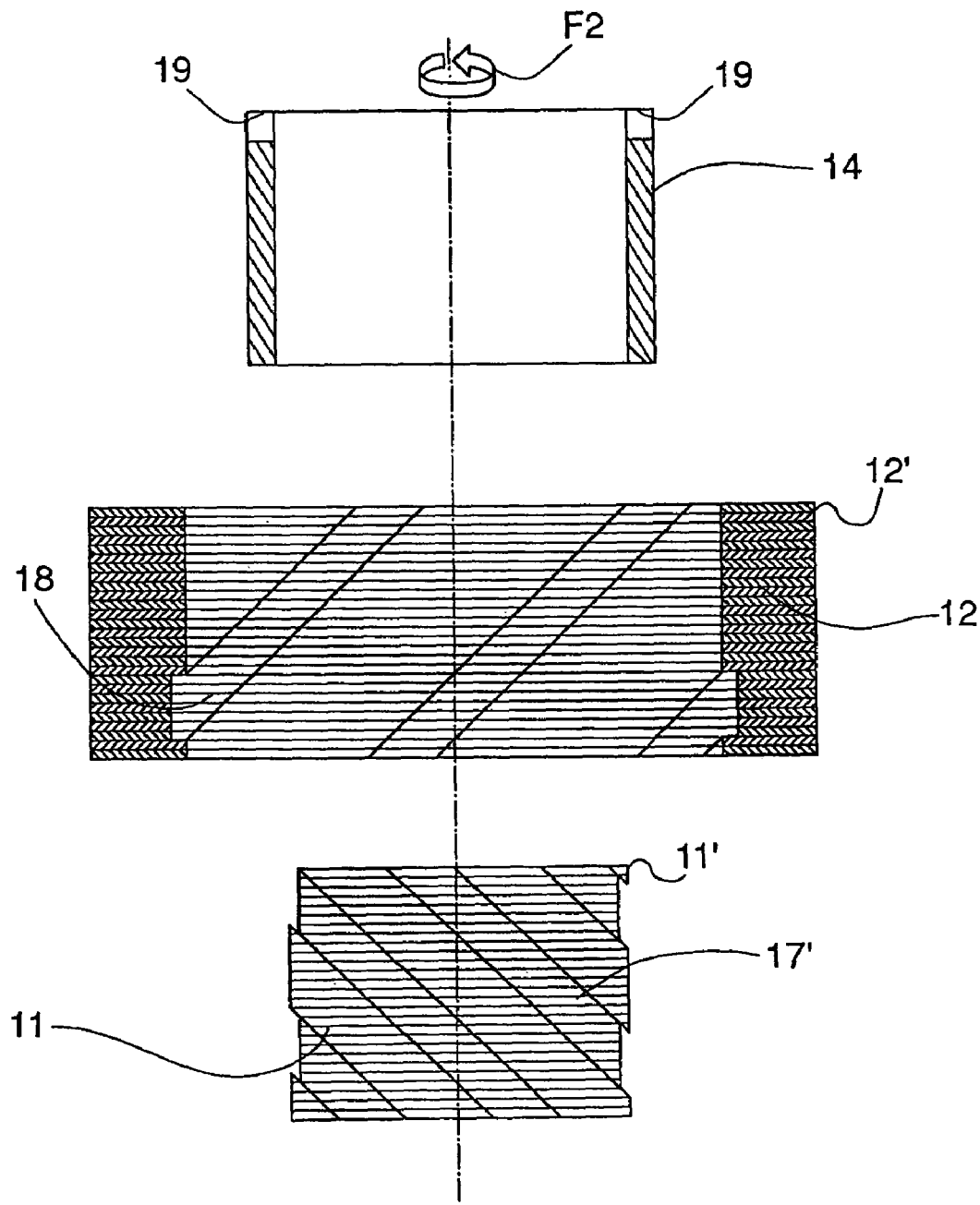
FIG. 6 is an exploded axial cross-sectional view of the motor of the pump shown in FIG. 5, constructed so as to form Holweck stages.

Referring now to FIGS. 5 and 6, a second embodiment of the invention is shown.

In the second embodiment, motor 8, shown in exploded view in FIG. 6 according to the same scheme as used in FIG. 2, is constructed so as to form a pair of Holweck pumping stages in parallel, one between external stator 12 and rotor 14, and the other between rotor 14 and internal stator 11.

A plurality of through holes 19 are formed in rotor 14, above internal and external stators 11, 12, said holes putting the hollow space between external stator 12 and rotor 14 in communication with the hollow space between rotor 14 and internal stator 11. In that way, part of the gas will be pumped so as to flow downwards in the hollow space between external stator 12 and rotor 14, and the remaining part will be pumped so as to flow downwards in the hollow space between rotor 14 and internal stator 11.

With respect to the embodiment previously discussed, in which both Holweck pumping stages were formed, so as to be run through in series by the gas, in the second embodiment gas is pumped through either Holweck pumping stage.

That second embodiment is constructively simpler, since gas being pumped will be discharged in the lower portion of cavity 6, due to channel 23 that is already formed substantially in correspondence of outlet port 3.

FIG. 6 shows motor 8, constructed so as to form a pair of Holweck pumping stages in parallel. Thus, the external surface of stator 11 and the internal surface of stator 12 (i.e., the surfaces facing rotor 14) each have a set of substantially helical grooves 17' and 18', respectively, for pumping gas towards outlet port 3. It is to be appreciated that the winding direction of said helical grooves 17' and 18' depends on the rotation direction of the motor rotor, indicated by arrow F2 in FIG. 6.

It will be understood the various aspects or details of the present invention may be changed without departing from the scope of the invention. Furthermore, the foregoing description is for the purpose of illustration only, and not for the purpose of limitation.

What is claim is:

1. A compact vacuum pump, comprising:
   a body, defining a pumping chamber
   a pump rotor (4) located within said pumping chamber, and
   a motor (8) for rotating said pump rotor (4) being a cup-type motor, said motor (8) having:
      a motor rotor (14) forming a single part with said pump rotor (4);
      an internal stator member (11) and an external stator member (12) defining a hollow space (13) therebetween and housing said motor rotor (14),
   wherein at least one of said internal and external stator members (11, 12) comprises grooves (17, 17', 18)

defining corresponding channels cooperating with a surface of said motor rotor for gas pumping.

2. The vacuum pump of claim 1, wherein said motor rotor (14) is made of a non-magnetic lightweight material.

3. The vacuum pump of claim 2, wherein said motor rotor (14) is made of an aluminium alloy.

4. The vacuum pump of claim 1, wherein said pump rotor (4) has a bell-shaped axial cavity housing said internal stator member (11).

5. The vacuum pump of claim 1, wherein at least one of said internal and external stator members (11, 12) define with said motor rotor (14) a Holweck pumping stage.

6. The vacuum pump of claim 1, wherein said internal and external stator members (11, 12) are provided with said channels (17, 18) and define with said motor rotor (14) a pair of Holweck pumping stages which are run through in series by the pumped gas.

7. The vacuum pump of claim 6, wherein said motor rotor(14) has at least one hole for putting said two Holweck pumping stages in communication.

8. The vacuum pump of claim 1, wherein said internal and external stator members (11, 12) are provided with said channels (17', 18) and define, with said motor rotor (14) a pair of Holweck pumping stages which are run through in parallel by the pumped gas.

9. The vacuum pump as claimed in any preceding claim, characterised in that at least one of said internal and external stator members (11, 12) comprises superimposed stacked rings (11', 12').

10. The vacuum pump of claim 9, wherein said rings have notches (21, 22) defining corresponding grooves for gas pumping when said rings are superimposed.

11. The vacuum pump of claim 10, wherein said notches define corresponding helical grooves when said rings are superimposed.

12. The vacuum pump of claim 10, wherein said notches (21, 22) have rectangular profile.

13. The vacuum pump of claim 12, wherein said motor (8) has power supply windings associated with said internal or external stator member (11, 12).

14. The vacuum pump of claim 13, further comprises a turbomolecular pumping stage.

* * * * *